United States Patent [19]

Otsuka

[11] Patent Number: 5,675,073
[45] Date of Patent: Oct. 7, 1997

[54] DEVICE FOR DETECTING LEAKAGE OF FUEL VAPOR

[75] Inventor: Takayuki Otsuka, Susono, Japan

[73] Assignee: Toyota Jidosha Kabushiki Kaisha, Aichi, Japan

[21] Appl. No.: 617,165

[22] Filed: Mar. 18, 1996

[30] Foreign Application Priority Data

Mar. 20, 1995 [JP] Japan .................... 7-061065

[51] Int. Cl.⁶ .................. G01M 3/32; G01M 3/26
[52] U.S. Cl. .................. 73/40.5 R; 73/49.2; 73/49.7
[58] Field of Search ................ 73/40.5 R, 49.7, 73/49.2 R, 49.2 T; 340/457, 438, 605

[56] References Cited

U.S. PATENT DOCUMENTS

| | | | |
|---|---|---|---|
| 4,583,072 | 4/1986 | Matsushita | 340/457 |
| 5,408,866 | 4/1995 | Kawamura et al. | 73/49.7 X |
| 5,451,927 | 9/1995 | Thompson | 340/438 X |
| 5,467,641 | 11/1995 | Williams et al. | 73/49.7 |

FOREIGN PATENT DOCUMENTS

| | | |
|---|---|---|
| U-61-159220 | 10/1986 | Japan . |
| U-61-189838 | 11/1986 | Japan . |
| A-62-244772 | 10/1987 | Japan . |
| A-63-166624 | 7/1988 | Japan . |
| U-64-11832 | 1/1989 | Japan . |
| A-6-26408 | 2/1994 | Japan . |

*Primary Examiner*—Michael Brock
*Attorney, Agent, or Firm*—Oliff & Berridge

[57] ABSTRACT

A device for detecting leakage of fuel vapor including a pressure sensor which is arranged in a fuel vapor conduit connected to the fuel tank. The pressure sensor detects the pressure inside the fuel tank. It is judged that the fuel vapor has not leaked from the fuel tank or the fuel vapor conduit before the engine is stopped based on the pressure inside the fuel tank detected by the pressure sensor and it is judged that the reattachment of the fuel cap has been forgotten when it is judged that the fuel vapor is leaking from the fuel tank when the operation of the engine is restarted after stopping of the engine.

16 Claims, 9 Drawing Sheets

Fig. 9

DEVICE FOR DETECTING LEAKAGE OF FUEL VAPOR

BACKGROUND OF THE INVENTION

1. Field of the Invention

The present invention relates to a device for detecting leakage of fuel vapor.

2. Description of the Related Art

Leakage of fuel vapor from a fuel tank or a conduit connected to a fuel tank causes air pollution. Consequently, it is necessary to quickly detect when such leakage of fuel vapor occurs. There are two main types of leakage of fuel vapor. The first is the leakage of fuel vapor from a damaged fuel tank or conduit connected to the fuel tank. The second is the leakage of fuel vapor when reattachment of the fuel cap has been forgotten after refueling.

The pressure in the fuel tank normally fluctuates and will become either positive or a vacuum. If there is leakage of fuel vapor, however, the pressure in the fuel tank will be held at substantially the atmospheric pressure. Accordingly, it is possible to determine that fuel vapor is leaking from the fact that the pressure in the fuel tank is being maintained at substantially the atmospheric pressure. However, the pressure in the fuel tank is held at substantially the atmospheric pressure both when the fuel tank or the conduit connected to the fuel tank is damaged and when reattachment of the fuel cap is forgotten, so while it will be possible to determine the fact that the pressure in the fuel tank is being held at atmospheric pressure, it is not possible to determine whether this was due to damage to the fuel tank etc. or to the reattachment of the fuel cap being forgotten.

Damage to a fuel tank etc. requires repair, while forgotten reattachment of the fuel cap can be dealt with by just reattaching the cap. Further, there is far greater leakage of fuel vapor in the case where reattachment of the fuel cap is forgotten compared with when the fuel tank etc. is damaged. Accordingly, forgotten reattachment of the fuel cap requires early detection separate from damage to the fuel tank etc.

In most vehicles, the fuel cap is provided at a refueling port disposed in a recess in the vehicle body, which is covered by opening and closing lid. Known in the art is a fuel tank which provides a permanent magnet in the fuel cap and provides a switch operating by that permanent magnet in the opening and closing lid or provides a switch in the lid which operates by direct contact with the fuel cap. In this way, it is possible to determine whether the reattachment of the fuel cap has been forgotten from the operation of these switches when the refueling is completed and the lid is closed (see Japanese Unexamined Patent Publication (Kokai) No. 62-244722).

Provision of a switch in the lid, however, not only is problematic in that it makes the construction of the lid more complicated, but also is problematic in that it does not work when no such lid is provided. Further, there is the problem that it will be mistakenly judged that the fuel cap has forgotten to be reattached even though the fuel cap is properly reattached, but the lid is not completely closed, while it will be judged that fuel vapor is not leaking from the fuel cap when the fuel cap has not been properly reattached and fuel vapor is leaking, but the lid is completely closed.

SUMMARY OF THE INVENTION

An object of the present invention is to provide a device for detecting leakage of fuel vapor, which is capable of correctly detecting the fact that the fuel cap has forgotten to be attached.

According to the present invention, there is provided a device for detecting a leakage of fuel vapor from a fuel tank or a conduit connected to the fuel tank in an engine, the device comprising a pressure detecting means for detecting a pressure in the fuel tank; a first judgement means for judging if fuel vapor was leaking from the fuel tank or the conduit connected to the fuel tank before the engine was stopped based on the pressure in the fuel tank; a second judgement means for judging if fuel vapor has leaked from the fuel tank or the conduit connected to the fuel tank when engine operation is restarted after the engine has stopped based on the pressure in the fuel tank; and a forgotten fuel cap reattachment judgement means for judging that reattachment of the fuel cap of the fuel tank has been forgotten when it is judged by the first judgement means that the fuel vapor has not leaked and it is judged by the second judgement means that the fuel vapor is leaking.

BRIEF DESCRIPTION OF THE DRAWINGS

The present invention may be more fully understood from the description of the preferred embodiments of the invention set forth below together with the accompanying drawings, in which.

DESCRIPTION OF THE PREFERRED EMBODIMENTS

Figure 1:
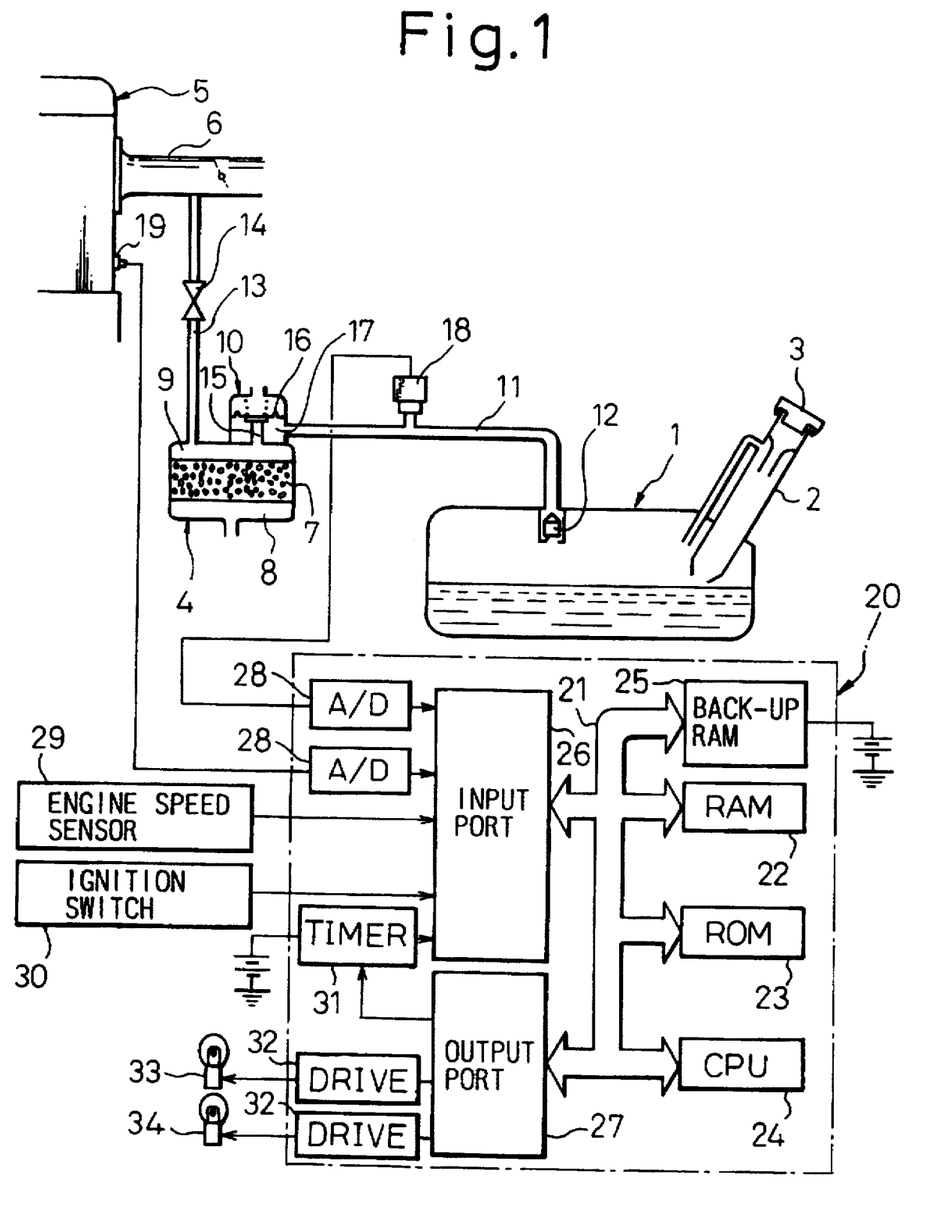
FIG. 1 is an overall view of the arrangement of a fuel tank and a fuel vapor conduit.

Referring to FIG. 1, reference numeral 1 is a fuel tank, 2 is a filler tube, 3 is a fuel cap attached to the opening of the filler tube 2, 4 is a charcoal canister, 5 is the engine body, and 6 is an intake pipe. The charcoal canister 4 is provided with an active carbon layer 7, an atmospheric pressure chamber 8 formed at one side of the active carbon layer 7 and communicating with the outside air, and a fuel vapor chamber 9 formed at the other side of the active carbon layer 7. The fuel vapor chamber 9 is on the one hand connected to the inside of the fuel tank 1 through a tank internal pressure control valve 10, a fuel vapor conduit 11, and a float 12 and is on the other hand connected to the inside of the intake pipe 6 through a purge conduit 13 and a purge control valve 14.

The tank internal pressure control valve 10 is provided with a valve port 15 communicating with the fuel vapor chamber 9, a diaphragm 16 for controlling the opening and closing of the valve port 15, and an annular chamber 17 formed around the valve port 15. This annular chamber 17 is connected to the inside of the fuel tank 1 through the fuel vapor conduit 11. The float 12 is ordinarily opened and closes the inlet of the fuel vapor conduit 11 to prevent the entry of the fuel into the fuel vapor conduit 11 when the liquid fuel in the fuel tank 1 rises in level. Accordingly, the pressure in the annular chamber 17 of the tank internal pressure control valve 10 becomes normally equal to the pressure inside the fuel tank 1.

When the pressure inside the annular chamber 17, that is, the pressure inside the fuel tank 1, exceeds a certain pressure, the diaphragm 16 opens the valve port 15. At this time, the fuel vapor inside the fuel tank 1 is supplied into the active carbon layer 7 through the fuel vapor conduit 11, the annular chamber 17, and the valve port 15 and is absorbed in the active carbon layer 7. On the other hand, the purge control valve 14 is opened when the engine is in a predetermined operating state. When the purge control valve 14 is opened, the fuel vapor absorbed in the active carbon in the active carbon layer 7 is freed from the active carbon. The freed fuel vapor is then purged inside the intake pipe 6.

An electronic control unit 20 is comprised of a digital computer and is provided with a random access memory (RAM) 22, read only memory (ROM) 23, microprocessor (CPU) 24, back-up RAM 25 connected to a constant power source, input port 26, and output port 27 connected to each other by a bidirectional bus 21. The fuel vapor conduit 11 has mounted in it a pressure sensor 18 for generating an output voltage proportional to the pressure in the fuel vapor conduit 11, that is, the pressure in the fuel tank 1. The output voltage of the pressure sensor 18 is input through a corresponding analog-to-digital (AD) converter 28 to the input port 26. The engine body 5 is provided with a coolant temperature sensor 19 for generating an output voltage proportional to the temperature of the engine coolant. The output voltage of the coolant temperature sensor 19 is input through the corresponding AD converter 28 to the input port 26.

Further, the input port receives as input an output pulse of an engine speed sensor 29 showing the engine speed and an on-off signal of an ignition switch 30. The input port 26 also receives an output signal of a timer 31 connected to a constant power source. This timer 31 is operated by a control signal output to the output port 27. On the other hand, the output port 27 is connected through a corresponding drive circuit 32 to the No. 1 alarm lamp 33 and the No. 2 alarm lamp 34.

Figure 2:
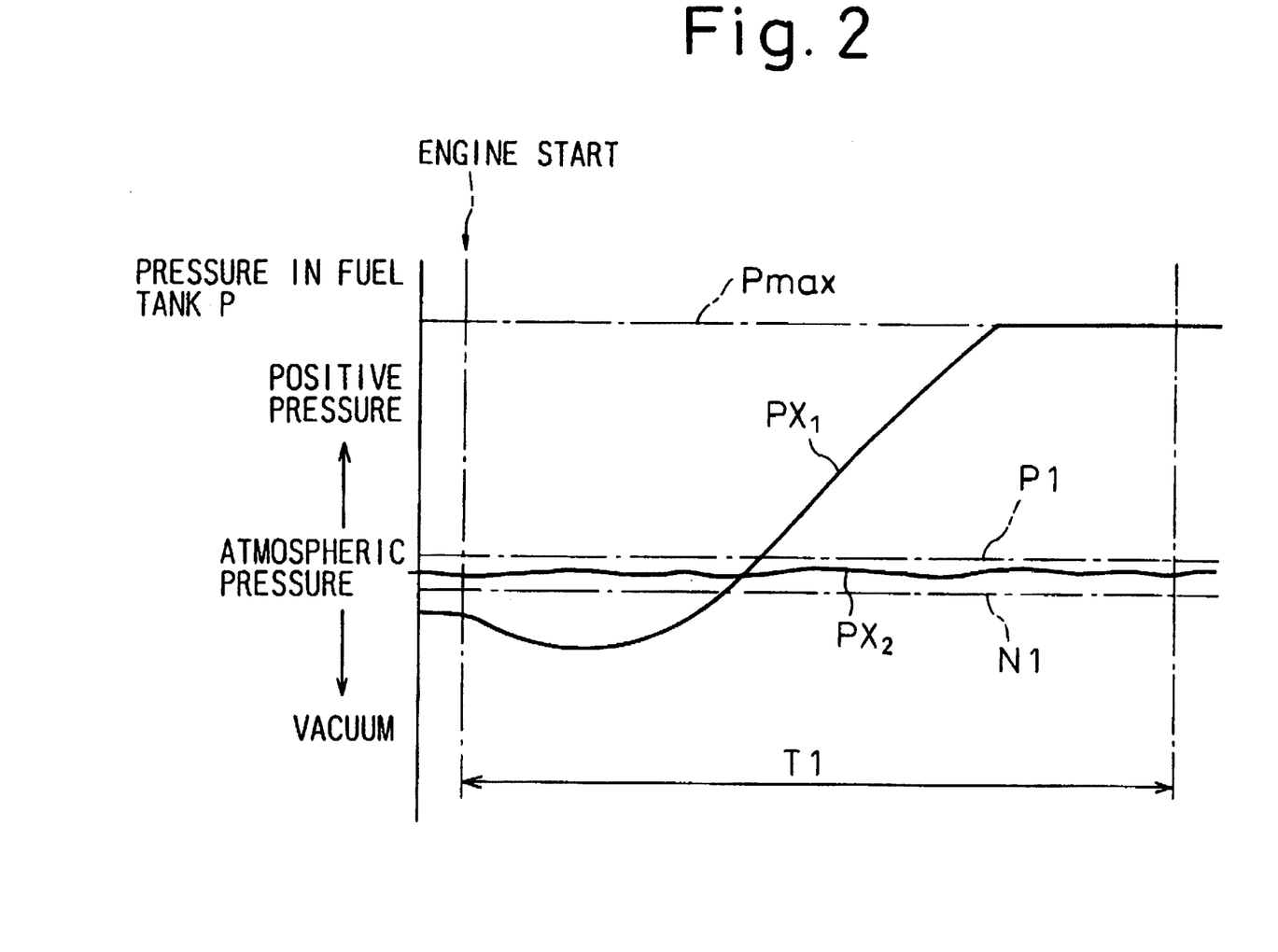
FIG. 2 is a view for explaining the method of detection of leakage of fuel vapor due to damage to the fuel tank etc.

FIG. 2 shows the changes in the pressure P inside the fuel tank 1 when the engine is started after the elapse of a relatively long time period. Note that in FIG. 2, the solid line $PX_1$ shows the case where the opening of the filler tube 2 is closed by the fuel cap 3 and the fuel vapor is not leaking from the fuel tank 1 and the fuel vapor conduit 11 connected to the inside of the fuel tank 1, while the solid line $PX_2$ shows the case where the opening of the filler tube 2 is closed by the fuel cap 3 and the fuel vapor is leaking from the fuel tank 1 and the fuel vapor conduit 11 connected to the inside of the fuel tank 1. Further, in FIG. 2, $P_{max}$ shows the valve opening pressure of the tank internal pressure control valve 10.

When the engine is operating, the temperature of the fuel in the fuel tank 1 becomes high and a large amount of fuel vapor is produced, so the pressure inside the fuel tank 1 becomes high, but when the engine operation is stopped, the fuel temperature falls and the amount of fuel vapor falls as well, so the pressure inside the fuel tank 1 gradually drops. Accordingly, if the engine is stopped for a relatively long period and there is no leakage of fuel vapor from the fuel tank 1 or the fuel vapor conduit 11 communicating with the inside of the fuel tank 1, when the engine is started, the pressure P inside the fuel tank 1 usually becomes a vacuum as shown by $PX_1$ in FIG. 2. If the engine is started and fuel in the fuel tank 1 starts being consumed, the pressure p in the fuel tank 1 falls for a while as shown by $PX_1$ in FIG. 2, then, along with the rise of the temperature of the fuel in the fuel tank 1, the pressure P in the fuel tank 1 gradually becomes higher. Next, when the pressure P in the fuel tank 1 reaches the valve opening pressure $P_{max}$ of the tank internal pressure control valve 10, the pressure P in the fuel tank 1 is maintained at $P_{max}$.

In this way, when the fuel vapor is not leaking from the fuel tank 1 or the fuel vapor conduit 11 connected to the inside of the fuel tank 1, the pressure in the fuel tank 1 changes between a vacuum and positive pressure after engine startup.

As opposed to this, when the fuel tank 1 or the fuel vapor conduit 11 connected to the fuel tank 1 is damaged and perforated and fuel vapor leaks from the hole, the pressure P inside the fuel tank 1 is maintained at substantially atmospheric pressure at all times as shown by the solid line $PX_1$ in FIG. 2. Accordingly, if the pressure inside the fuel tank 1 becomes substantially atmospheric pressure after the start of the engine, it means that fuel vapor is leaking, while if the pressure inside the fuel tank 1 becomes more than a certain extent of a vacuum or more than a certain extent of a positive pressure after the start of the engine, it means that fuel vapor is not leaking.

As mentioned earlier, however, when the engine is stopped for a long period of time, if the fuel vapor is not leaking, the fuel tank 1 will normally become a vacuum. This however is a general case. The pressure inside the fuel tank 1 changes in accordance with the time the engine is stopped and the surrounding temperature and therefore the pressure inside the fuel tank when the engine is started may become atmospheric pressure or may become a positive pressure. On the other hand, as mentioned earlier, when the fuel starts to be consumed after engine startup, the pressure inside the fuel tank 1 will fall for a while, then when the temperature of the fuel rises after a bit, the pressure inside the fuel tank 1 will rise. That is, the pressure inside the fuel tank 1 after the start of the engine is determined by the difference in the magnitude of the pressure reducing action caused by the consumption of the fuel and the pressure raising action caused by the rise of the temperature of the fuel. In this case, if the fall in pressure due to the consumption of the fuel and the rise in pressure due to the rise in the temperature of the rise balance, then the pressure in the fuel tank 1 will be maintained at substantially atmospheric pressure and therefore it will seem as if fuel vapor is leaking.

Even if, however, the fall in pressure due to the consumption of fuel and the rise in pressure due to the rise in the temperature of the fuel balance and thereby the pressure in the fuel tank is maintained at substantially atmospheric pressure after the start of the engine, the pressure in the fuel tank 1 will not be held at substantially atmospheric pressure for that long a time. The pressure in the fuel tank 1 will always shift from the atmospheric pressure and usually start to rise several minutes after the engine startup. Accordingly, in this embodiment of the present invention, a time T1 (FIG. 2) somewhat longer than the maximum time where there is a possibility of the pressure in the fuel tank 1 being held at substantially atmospheric pressure after engine startup regardless of the fact that fuel vapor is not leaking is preset and a judgement made as to if fuel vapor is leaking from the behavior of the pressure in the fuel tank 1 within that time T1.

More specifically, an upper limit pressure P1 somewhat higher than the atmospheric pressure and a lower limit pressure N1 somewhat lower than the atmospheric pressure are preset as shown in FIG. 2. When the pressure P in the fuel tank 1 continues to be held between the upper limit pressure P1 and the lower limit pressure N1 for the time T1, it is judged that fuel vapor is leaking, while if the pressure P in the fuel tank becomes higher than the upper limit pressure P1 or becomes lower than the lower limit pressure N1 during the time T1, it is judged that the fuel vapor is not leaking. In this embodiment of the present invention, the leakage of the fuel vapor in the case of damage to the fuel tank 1 or the fuel vapor conduit 11 connected to the fuel tank 1 is detected in this way.

When the engine is stopped for refueling and the fuel cap 3 forgets to be reattached after the end of the refueling and then the engine is restarted, the pressure in the fuel tank 1 will be maintained at atmospheric pressure. Accordingly, while the pressure in the fuel tank 1 will be held between the upper limit pressure P1 and the lower limit pressure N1 for the time T1 shown in FIG. 2, it will not be known if this is due to damage to the fuel tank 1 etc. or due to reattachment of the fuel cap 3 being forgotten.

When the fuel tank 1 etc. is damaged, however, the pressure in the fuel tank 1 will be held at substantially atmospheric pressure both before the engine is stopped and after the engine is restarted. As opposed to this, if the fuel cap 3 is detached while the engine is stopped and then forgets to be reattached, the pressure inside the fuel tank 1 before the engine is stopped will not become atmospheric pressure and the pressure in the fuel tank 1 after the engine is restarted will become atmospheric pressure. Accordingly, if the pressure inside the fuel tank 1 does not become substantially atmospheric pressure before the engine is stopped and the pressure in the fuel tank 1 becomes substantially atmospheric pressure after the engine is restarted, in other words, if it is judged that fuel vapor was not leaking before the engine was stopped and it is judged that fuel vapor is leaking after the engine is restarted, then it can be judged that the fuel cap 3 was detached while the engine was stopped and then reattachment of the fuel cap 3 was forgotten. This is the basic thinking behind the present invention.

By using this basic thinking of the present invention, it is possible to detect if reattachment of the fuel cap 3 has been forgotten. When reattachment of the fuel cap 3 is forgotten, however, a large amount of fuel vapor will be released into the outside air, so it is necessary to to detect forgotten reattachment of the fuel cap as early as possible. Further, a fuel cap 3 forgets to be reattached only when refueling the vehicle with the engine stopped. To avoid mistaken judgement, therefore, it is preferable to judge if the fuel cap has been forgotten to be reattached only when there is a possibility that the car is being refueled and not to judge if the reattachment of the fuel cap has been forgotten when there is no possibility of refueling. In this case, when the engine is stopped for refueling, the time the engine is stopped is relatively short. Therefore, when the time the engine is stopped is short, there is a possibility that the vehicle is being refueled. Accordingly, in this embodiment of the present invention, when the time the engine is stopped is short, it is judged that there is a possibility that the car is being refueled and therefore a judgement is made at that point as to if the fuel cap 3 has forgotten to be reattached. This will be explained next referring to FIG. 3.

Figure 3:
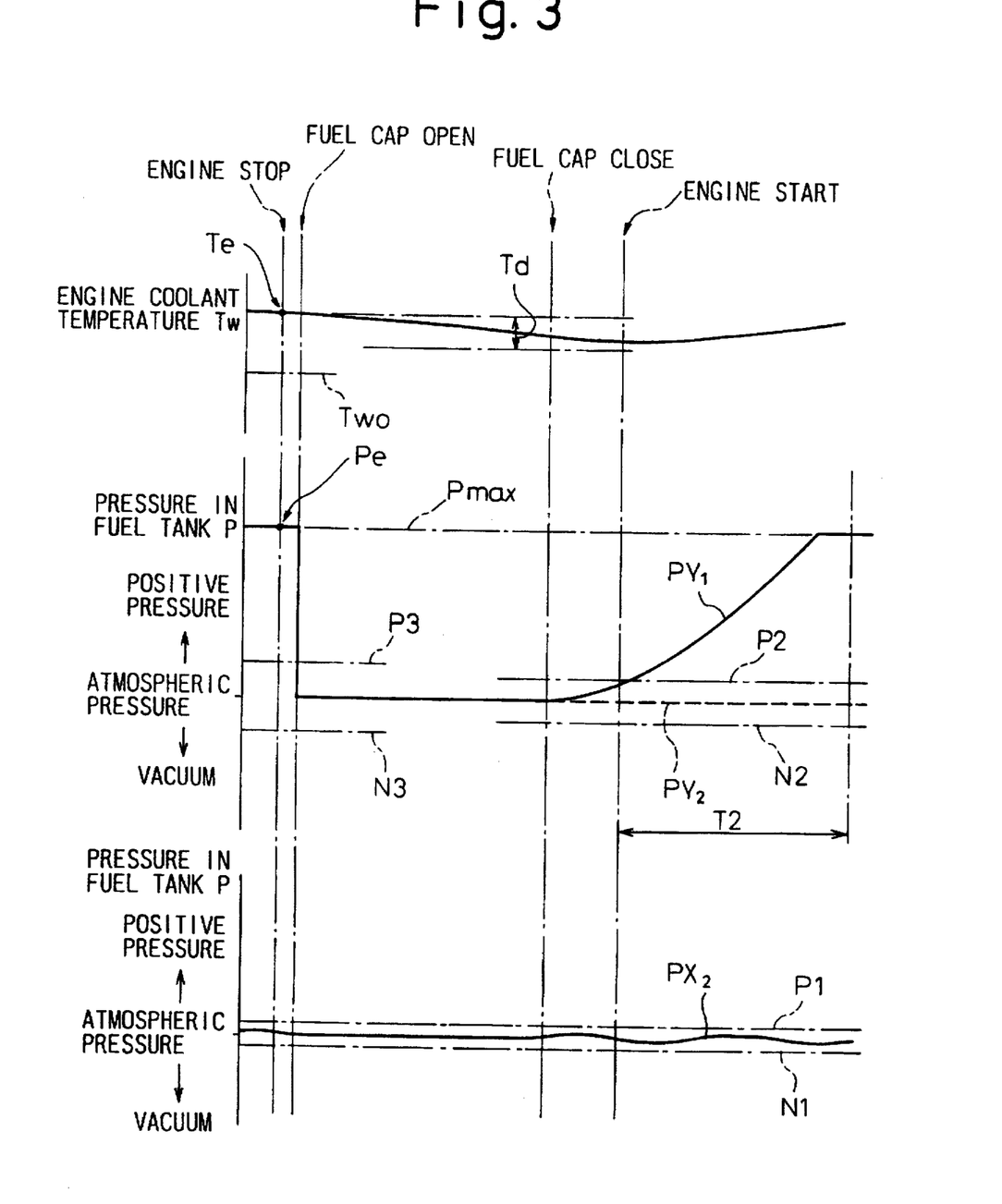
FIG. 3 is a view for explaining the method of detection of forgotten reattachment of the fuel cap.

FIG. 3 shows the changes in the engine coolant temperature Tw and the changes in the pressure P in the fuel tank 1 when the fuel cap is detached and the vehicle is being refueled while the engine is stopped. Note that in FIG. 3, the solid line $PY_1$ shows the case where the fuel cap 3 is properly reattached after the refueling is ended, and the broken line $PY_2$ shows the case where the fuel cap 3 forgets to be reattached after the end of the refueling. Further, the solid line $PX_1$ shows the case where fuel vapor is leaking from the fuel tank 1 etc. due to damage to the fuel tank 1 etc.

If engine is stopped and the fuel cap 3 is detached for refueling in a state where the engine has been operated for more than a certain time and the pressure P in the fuel tank 1 has been held at the valve opening pressure $P_{max}$ of the tank internal pressure control valve 10, then the pressure P in the fuel tank 1 will fall rapidly to atmospheric pressure as shown by the line $PY_1$. Next, while the fuel cap 3 is detached, the pressure P in the fuel tank 1 will be held at atmospheric pressure. When the refueling is completed and the fuel cap 3 is then reattached, the pressure P in the fuel tank 1 will start to rise normally as shown by the solid line $PY_1$. That is, during refueling, the temperature in the fuel tank 1 will remain high and the temperature of the fuel remaining at that time will be high, so the fuel which is newly supplied will be heated immediately after refueling. Further, the newly supplied fuel will contain a large amount of a low boiling point component which will start to evaporate immediately after refueling. Accordingly, as explained above, when the fuel cap 3 is reattached, normally the pressure P in the fuel tank 1 will start to rise and will reach the $P_{max}$ within a short time.

As opposed to this, when the fuel cap 3 forgets to be reattached, as shown by the broken line $PY_2$ in FIG. 3, the pressure in the fuel tank i will be held at atmospheric pressure after the start of the engine. On the other hand, when fuel vapor is leaking from the fuel tank 1 etc. due to damage to the fuel tank 1 etc., the pressure P in the fuel tank 1 will be held at substantially atmospheric pressure at all times as shown by the solid line $PX_2$ in FIG. 3. Accordingly, when the pressure P in the fuel tank 1 does not become substantially atmospheric pressure before the engine is stopped, if the pressure P in the fuel tank 1 becomes atmospheric pressure after the engine is started, the fuel cap 3 has forgotten to be reattached, while if the pressure P in the fuel tank 1 does not become substantially atmospheric pressure, the fuel cap 3 has been properly reattached. Note that in this embodiment of the present invention, the upper limit pressure P2 ($\geq$P1) and the lower limit pressure N2 ($\leq$N1) are preset for the pressure in the fuel tank 1 after engine startup as shown in FIG. 3 and it is judged if the fuel cap 3 has forgotten to be reattached by whether the pressure P in the fuel tank 1 is being held between the upper limit pressure P2 and the lower limit pressure N2 over the time T2 after engine startup.

Further, in the embodiment according to the present invention, when the engine coolant temperature Te (FIG. 3) when the engine is stopped is higher than the setting Two and the fall in the engine coolant temperature Tw in the period from when the engine is stopped to when it is restarted is smaller than the setting Td, it is deemed that there is a possibility that the engine has been stopped for refueling. Only when there is a possibility that the engine has been stopped for refueling is it judged if the fuel cap 3 has forgotten to be reattached. That is, if the fall in the engine coolant temperature Tw in the period from when the engine is stopped to when it is restarted is smaller than the setting Td, the engine has been stopped for a short time and therefore there is a possibility that the engine was stopped for refueling. Further, there are two reasons for judging if the engine coolant temperature Tw when the engine is stopped is higher than the setting Two. That is, if the engine coolant temperature Te when the engine is stopped is too low, the fall in the engine coolant temperature Tw when the engine is stopped will become extremely small and accordingly it will not be possible to accurately detect if the engine has been stopped for a short time. This is the first reason.

The second reason is that if the engine coolant temperature Te at the time of engine stoppage is low, it is not possible to quickly judge if the fuel cap 3 has forgotten to be reattached. That is, the fact that the engine coolant temperature Te is low at the time of engine stoppage means that not that much time has elapsed from when the engine was started and therefore means that the temperature of the fuel tank 1 and the fuel in the fuel tank 1 is low. When the temperature of the fuel tank 1 etc. is low in this way, if the engine is stopped for refueling, even if restarted thereafter, the pressure P in the fuel tank 1 will not quickly rise as shown by $PY_1$ in FIG. 3. If the pressure P in the fuel tank 1 no longer quickly rises, then the time T2 (FIG. 3) will have to be lengthened to enable accurate detection of forgotten reattachment of the fuel cap 3 and therefore it will not be possible to quickly detect forgotten reattachment of the fuel cap 3. Accordingly, in this embodiment of the present invention, it is judged if the engine coolant temperature Te when the engine is stopped is higher than the setting Two.

An explanation will next be made of the routine for detecting leakage of fuel vapor referring to FIG. 4 to FIG. 7. This routine is executed by interruption every predetermined time interval.

Figure 4:
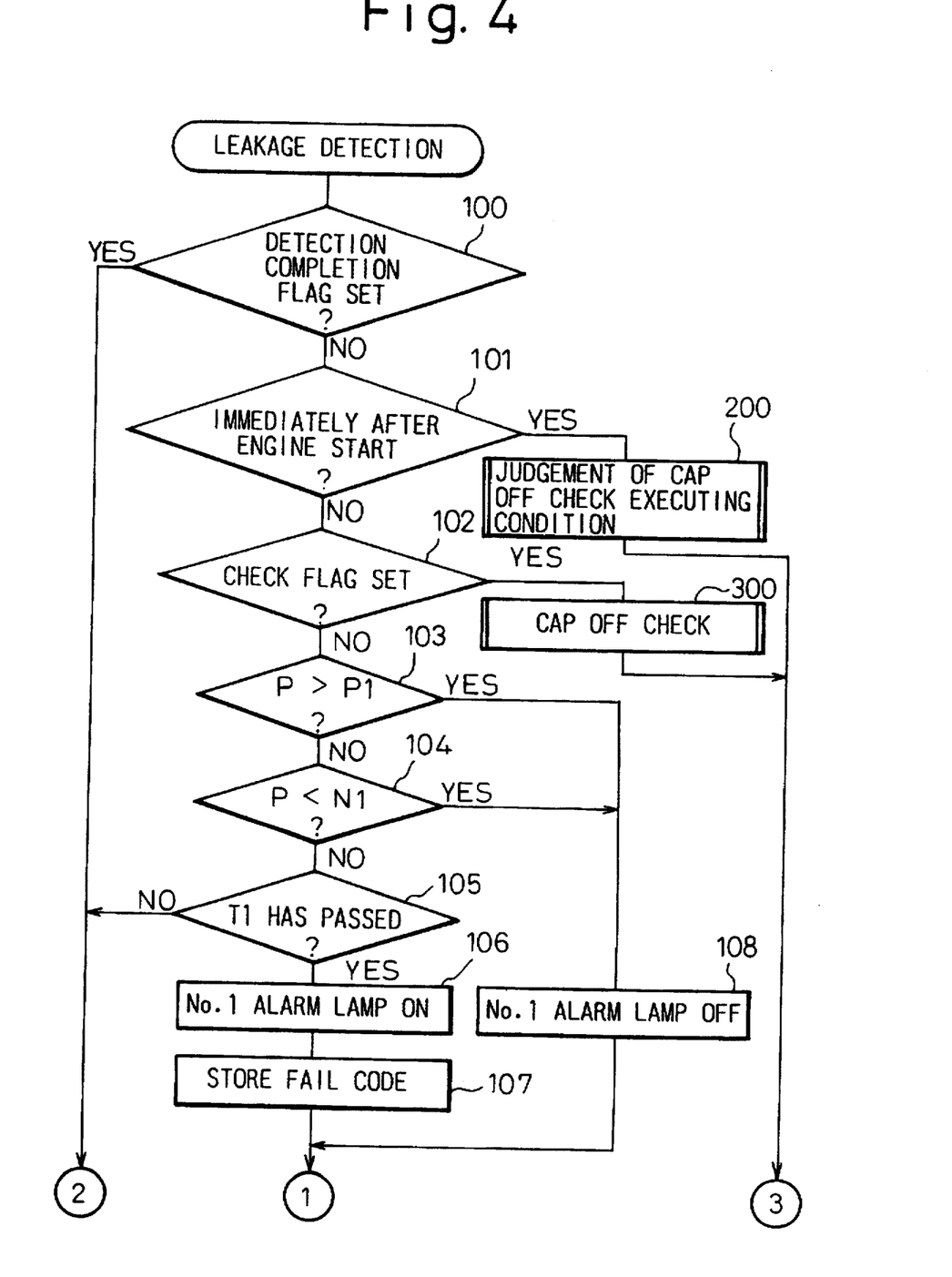
FIG. 4 is a flow chart of the detection of leakage of the fuel vapor.
Figure 5:
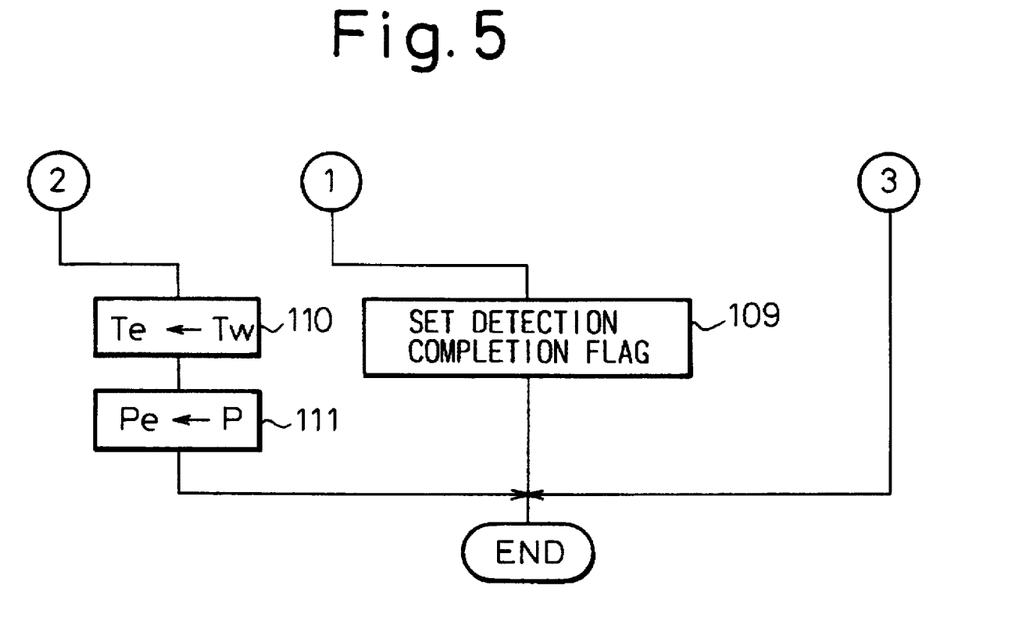
FIG. 5 is a flow chart of the detection of leakage of the fuel vapor.

Referring to FIG. 4 and FIG. 5, first, at step 100, it is judged if the detection completion flag showing that the detection of leakage of the fuel vapor has been completed is get. When the routine proceeds to step 100 for the first time after the ignition switch 30 is turned on and power is supplied to the CPU 24, the detection completion flag is reset. Accordingly, at this time, the routine proceeds to step 101. At step 101, it is judged if it is directly after the engine startup, for example, if the engine speed has not become higher than 400 rpm. When directly after engine startup, the routine proceeds to step 200, where in is judged if the conditions stand for executing a check to see if the fuel cap 3 has forgotten to be reattached. The routine for judgement of these conditions is shown in FIG. 6.

Figure 6:
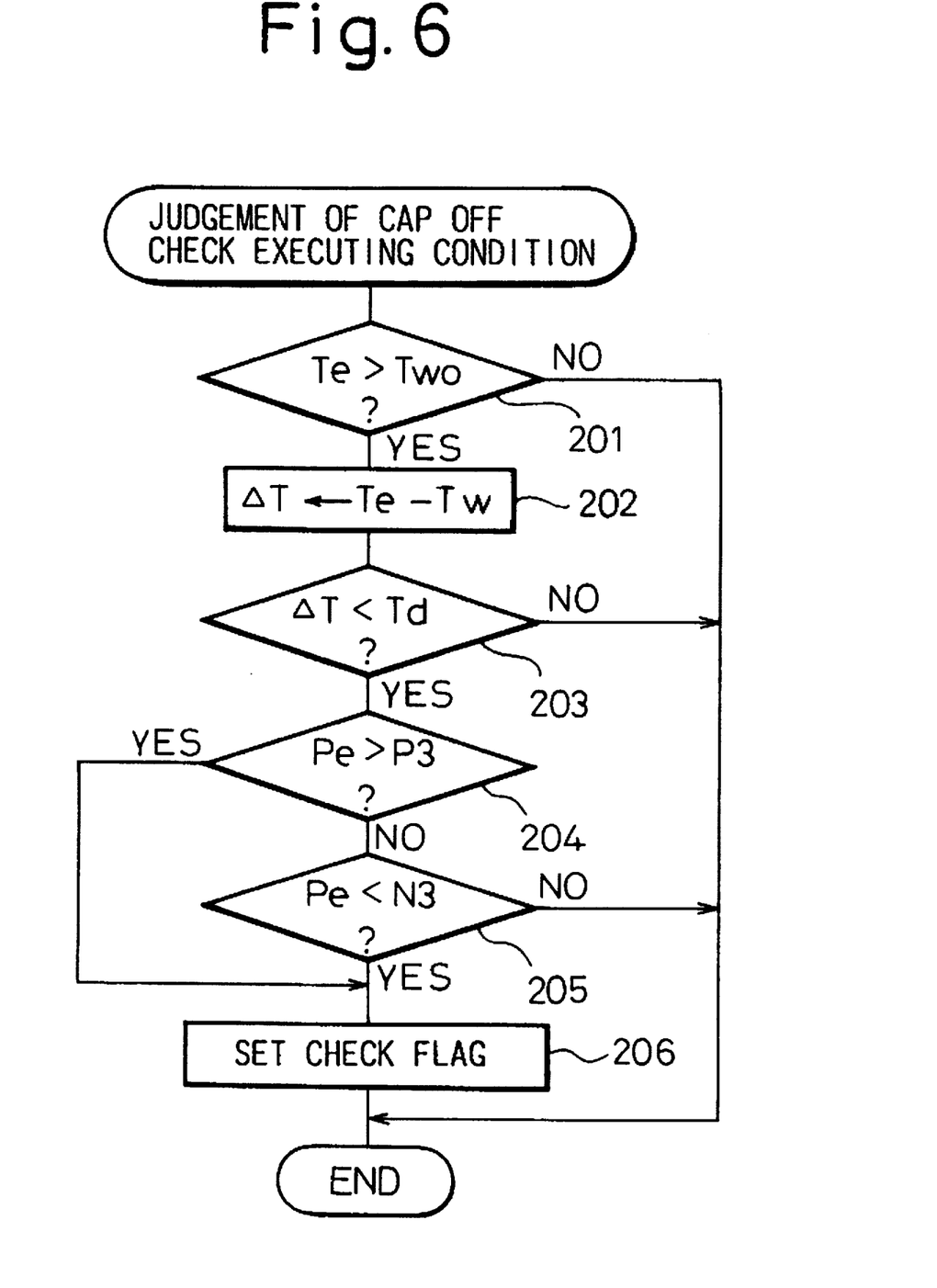
FIG. 6 is a flow chart for judging if the conditions for checking for forgotten reattachment of the fuel cap stand or not.

Referring to FIG. 6, first, at step 201, it is judged if the engine coolant temperature Te (FIG. 3) at the time when the engine is stopped, which is stored in the back-up RAM 25, is higher than a setting Two. When Te≦Two, the routine proceeds to step 202, where the temperature difference ΔT (=Te−Tw) between the engine coolant temperature Te at the time the engine is stopped and the current engine coolant temperature Tw is calculated. Next, at step 203, it is judged if the temperature difference ΔT is less than the setting Td. When ΔT<Td, the routine proceeds to step 204, where it is judged if the pressure Pe (FIG. 3) in the fuel tank 1 when the engine is stopped, which is stored in the backup RAM 25, is higher than the setting P3 (≧P2) shown in FIG. 3. When Pe>P3, the routine proceeds to step 206, where the check flag is set. As opposed to this, when Pe≦P3, the routine proceeds to step 205, where it is judged if the pressure Pe in the fuel tank 1 when the engine is stopped is lower than the setting N3 (≦N2) shown in FIG. 3. When Pe–N3, the processing cycle is ended, while when P<N3, the routine proceeds to step 206, where the check flag is set.

Accordingly, the check flag showing that it should be detected if the reattachment of the fuel cap 3 has been forgotten is set when Te>Two, ΔT<Td, and Pe>P3 or Pe<N3.

That is, the check flag is not set when Te≦Two, as mentioned before, since it is not possible to accurately detect if the engine has been stopped or not for refueling, the check flag is not set when ΔT≧Td, since the possibility of the engine being stopped for refueling is low, and the check flag is not set when P3≧Pe≧N3, since it is not possible to determine if fuel vapor is leaking due to damage to the fuel tank 1 etc.

Returning to FIG. 4 and FIG. 5, if the judgement of the conditions for execution of a check for cap detachment at step 200 is ended, at the next interruption, the routine proceeds from step 101 to step 102, where it is judged if the check flag has been set or not. When the check flag has not been set, the routine proceeds to step 103, where leakage of the fuel vapor due to damage to the fuel tank 1 etc. is detected. As opposed to this, when the check flag has been set, the routine proceeds to step 300, where a check is made as to if the reattachment of the fuel cap 3 has been forgotten. This check routine is shown in FIG. 7.

Figure 7:
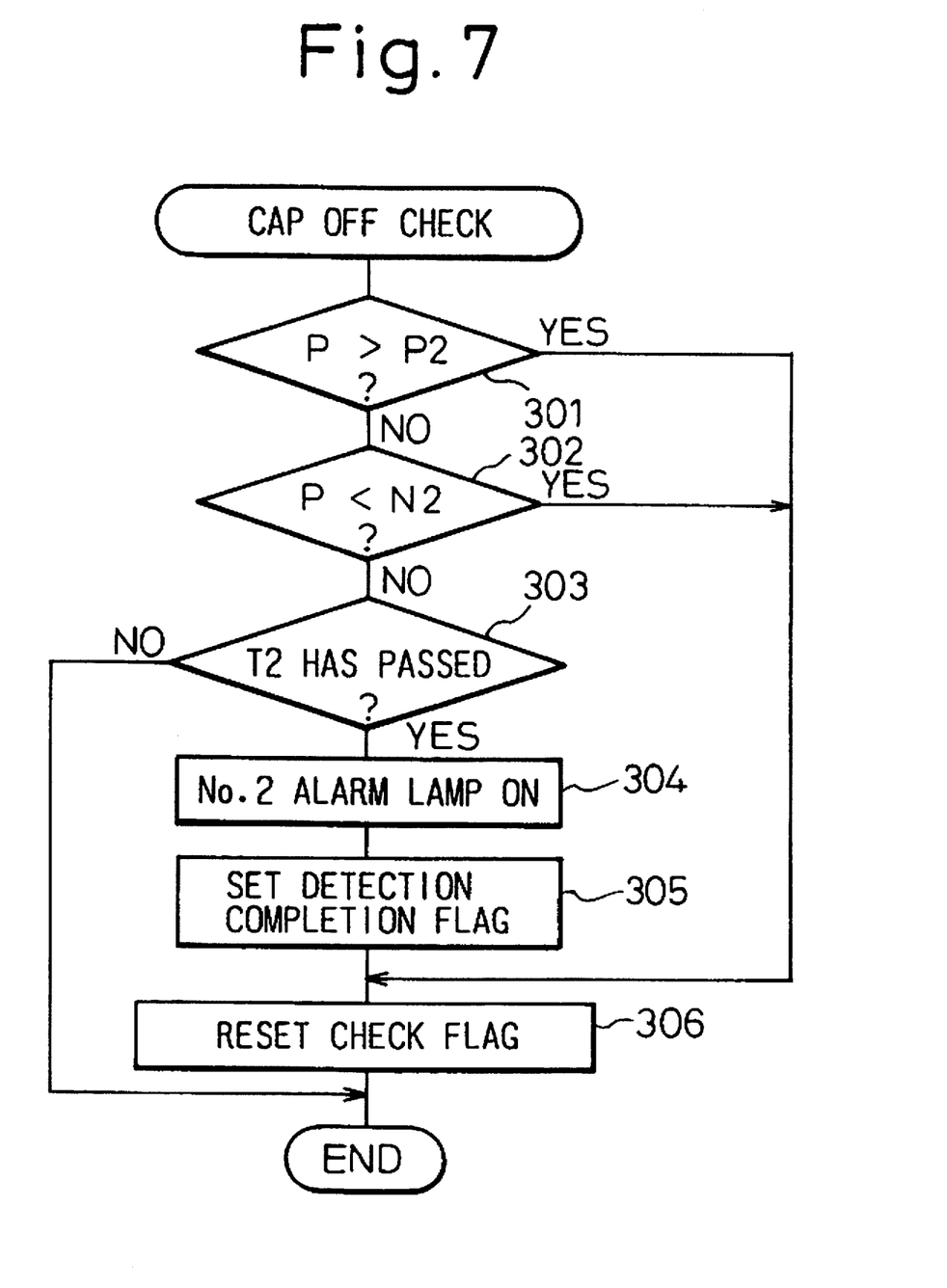
FIG. 7 is a flow chart of the check of the forgotten reattachment of the fuel cap.

Referring to FIG. 7, first, at step 301, it is judged if the current pressure P in the fuel tank is higher than the setting P2 (FIG. 2). When P>P2, the routine proceeds to step 306, where the check flag is reset. As opposed to this, when P≦P2, the routine proceeds to step 302, where it is judged if the current pressure P2 in the fuel tank 1 is less than the setting N2 (FIG. 3). When P<N2, the routine proceeds to step 306, where the check flag is reset, while when P≧N2, the routine proceeds to step 303, where it is judged if a predetermined time T2 has elapsed after the engine startup. This predetermined time T2 may be considerably shorter than the leakage check time T1 (FIG. 2) of the fuel vapor due to damage to the fuel tank 1 etc. When the predetermined time T2 has not elapsed after engine startup, the processing cycle is ended, while if the predetermined time T2 has elapsed after the engine startup, the routine proceeds to step 304, where the No. 2 alarm lamp 34 is lit up. Next, at step 305, the detection completion flag is set, then at step 306, the check flag is reset.

That is, if P becomes greater than P2 or P becomes less than N2 after engine startup, the fuel cap 3 has been properly reattached, so the No. 2 alarm lamp 34 is not lit up. As opposed to this, the pressure P in the fuel tank 1 after engine startup becomes P2≧P≧N2. If this state continues for a predetermined time T2, it is judged the the fuel cap 3 has forgotten to be reattached. At this time, the No. 2 alarm lamp 34 is lit up. Further, at this time, the detection completion flag is set and as a result no check is made of leakage of the fuel vapor due to damage to the fuel tank 1 etc.

Returning to FIG. 4 and FIG. 5, at step 103, it is judged if the current pressure P in the fuel tank 1 is higher than the setting P1 (FIG. 2). When P>P1, the routine proceeds to step 108, where the No. 1 alarm lamp 33 is extinguished, then the routine proceeds to step 109, where the detection completion flag is set. As opposed to this, when P≦P1, the routine proceeds to step 104, where it is judged if the current pressure P in the fuel tank 1 is lower than the setting N1 (FIG. 2). When P<N1, the routine proceeds to step 108, where the No. 1 alarm lamp 33 is extinguished, then the routine proceeds to step 109, where the detection completion flag is set.

On the other hand, when P≧N1, the routine proceeds to step 105, where it is judged if a predetermined time T1 (FIG. 2) has elapsed after the engine startup. When the predetermined time T1 has not elapsed after the engine startup, the routine proceeds to step 110, where the current engine coolant temperature Tw is stored in the back-up RAM 25 as Te, then, at step 111, the current pressure P in the fuel tank 1 is stored in the back-up RAM 25 as Pe. As opposed to this, when the predetermined time T1 has elapsed from engine startup, the routine proceeds to step 106, where the No. 1 alarm lamp 33 is lit up. Next, the routine proceeds to step 107, where a fill code showing that there is damage to the fuel tank 1 etc. is stored in the back-up RAM 25, then at step 109 the detection completion flag is set. If the detection completion flag is set, the routine jumps from step 100 to step 110.

That is, if P becomes greater than P1 or P becomes less than N1 after the engine is restarted, since there is no leakage of fuel vapor due to damage to the fuel tank 1 etc., the No. 1 alarm lamp 33 is extinguished. As opposed to this, after the engine startup, the pressure P in the fuel tank 1 becomes P1≧P≧N1. If this state continues for a predetermined time T1, it is judged that fuel vapor is leaking due to damage to the fuel tank 1 etc. At this time, the No. 1 alarm lamp 33 is lit up.

Figure 8:
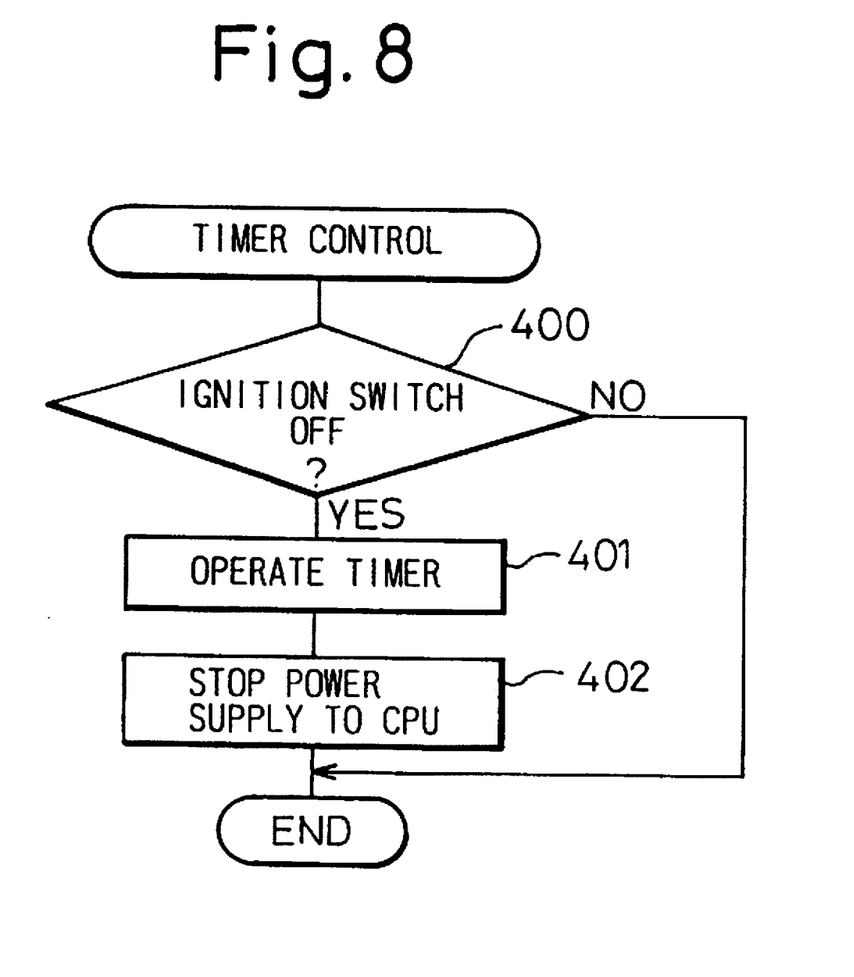
FIG. 8 is a flow chart of the control of a timer.
Figure 9:
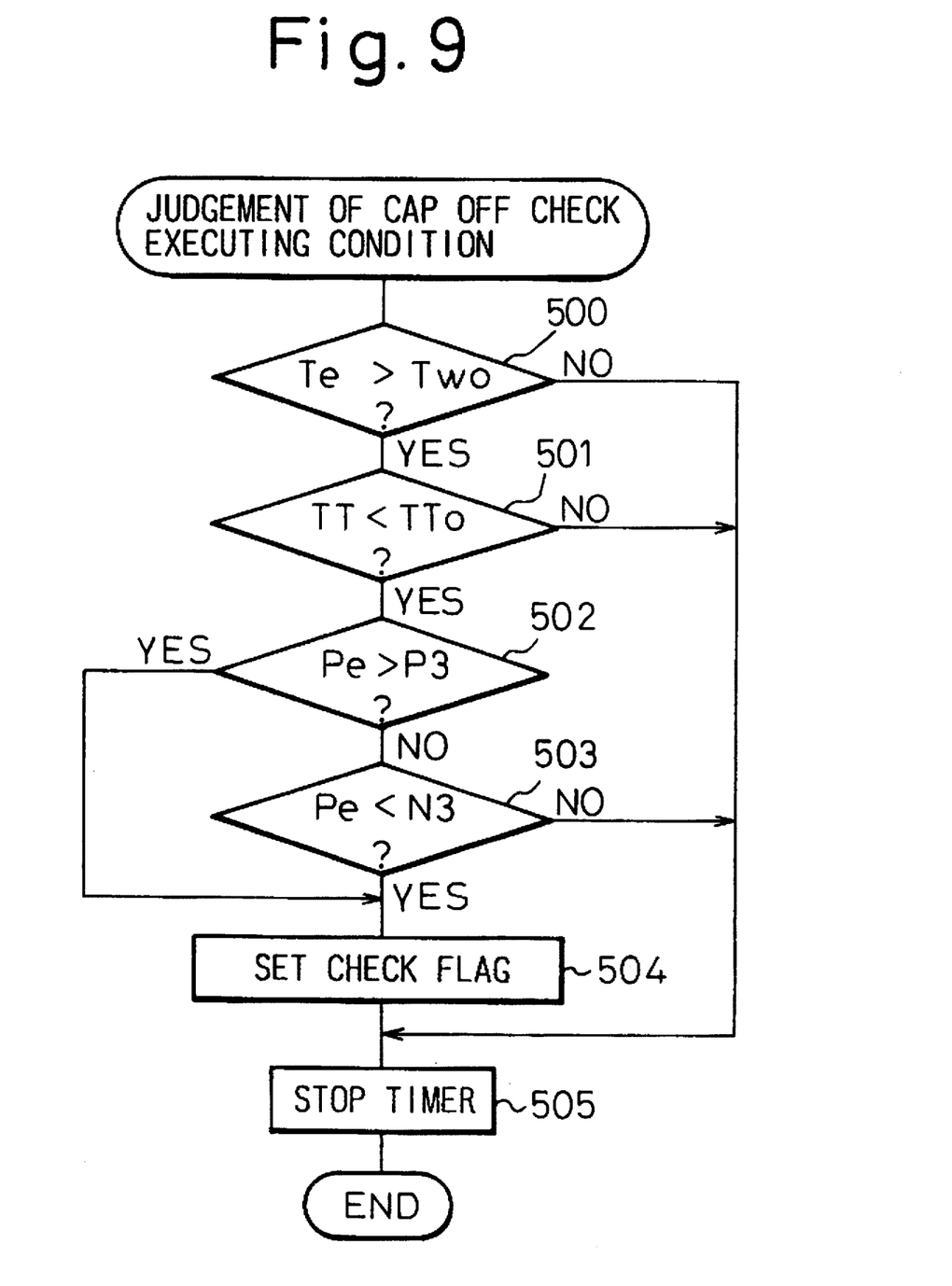
FIG. 9 is a flow chart for judging if the conditions for checking for forgotten reattachment of the fuel cap stand or not.

FIG. 8 and FIG. 9 show another embodiment. In this embodiment, the time during which the engine is stopped is directly measured. Note that in this embodiment as well, the routine shown in FIG. 4, FIG. 5, and FIG. 7 is used as it is. At step 200 of FIG. 4, the routine shown in FIG. 9 is used instead of the routine shown in FIG. 6.

FIG. 8 shows the control routine of the timer 31 shown in FIG. 1. This routine is executed by interruption every predetermined time period. Referring to FIG. 8, first, at step 400, it is judged if the ignition switch 30 has been turned off. If the ignition switch 30 is turned off, the timer 31 is actuated and the time starts to be counted. Next, at step 402, power stops being supplied to the CPU 24.

Referring to FIG. 9, first, at step 500, it is judged if the engine coolant temperature Te (FIG. 3) at the time when the engine is stopped, which is stored in the back-up RAM 25, is higher than a setting Two. When Te ≦Two, the routine proceeds to step 505, where the operation of the timer 31 is stopped. As opposed to this, when Te>Two, the routine proceeds to step 501, where it is judged if the engine stopping time TT, which is counted by the timer 31, is shorter than the setting TTo. When TT≧TTo, the routine proceeds to step 505, where he operation of the timer 31 is stopped. As opposed to this, when TT<TTo, the routine proceeds to step 502, where it is judged if the pressure Pe (FIG. 3) inside the fuel tank 1 when the engine is stopped, which is stored in the back-up RAM 25, is higher than the setting P3 shown in FIG. 3. When Pe>P3, the routine proceeds to step 504, where the check flag is set, then the routine proceeds to step 505. As opposed to this, when Pe≦P3, the routine proceeds to step 503, where it is judged if the pressure Pe in the fuel tank 1 when the engine is stopped is lower than the setting N3 shown in FIG. 3. When Pe≧N3, the routine proceeds to step 505, while when Pe<N3, the routine proceeds to step 504, where the check flag is set.

Accordingly, the check flag showing that it should be detected if the reattachment of the fuel cap 3 has been forgotten is set when Te>Two, TT<TTo, and Pe>P3 or Pe<N3. That is, the check flag is not set when Te≦Two, as mentioned before, since it is not possible to accurately detect if the engine has been stopped or not for refueling, the check flag is not set when TT≧TTo, since the possibility of the engine being stopped for refueling is low, and the check flag is not set when P3≧Pe≧N3, since it is not possible to determine if fuel vapor is leaking due to damage to the fuel tank 1 etc.

While the invention has been described by reference to specific embodiments chosen for purposes of illustration, it should be apparent that numerous modifications could be made thereto by those skilled in the art without departing from the basic concept and scope of the invention.

I claim:

1. A device for detecting a leakage of fuel vapor from a fuel tank or a conduit connected to the fuel tank for use with an engine, the device comprising a pressure detecting means for detecting a pressure in the fuel tank;

a first judgement means for judging if fuel vapor was leaking from the fuel tank or the conduit connected to the fuel tank before the engine was stopped based on the pressure in the fuel tank;

a second judgement means for judging if fuel vapor has leaked from the fuel tank or the conduit connected to the fuel tank when engine operation is restarted after the engine has stopped based on the pressure in the fuel tank; and a forgotten fuel cap reattachment judgement means for judging that reattachment of the fuel cap of the fuel tank has been forgotten when it is judged by the first judgement means that the fuel vapor has not leaked and it is judged by the second judgement means that the fuel vapor is leaking.

2. A device as set forth in claim 1, wherein said first judgement means judges that the fuel vapor is not leaking from the fuel tank or the conduit connected to the fuel tank when the pressure in the fuel tank before the engine stops is not substantially the atmospheric pressure.

3. A device as set forth in claim 2, wherein said first judgement means judges that the pressure in the fuel tank is not substantially the atmospheric pressure when the pressure inside the fuel tank is not within a certain range of the atmospheric pressure.

4. A device as set forth in claim 1, wherein said second judgement means judges that the fuel vapor is leaking from the fuel tank or the conduit connected to the fuel tank when the pressure in the fuel tank after restart of the engine operation is substantially the atmospheric pressure.

5. A device as set forth in claim 4, wherein said second judgement means judges that the pressure in the fuel tank is substantially the atmospheric pressure when the pressure inside the fuel tank is within a certain range of the atmospheric pressure.

6. A device as set forth in claim 4, wherein said first judgement means judges that the fuel vapor is leaking from the fuel tank or the conduit connected to the fuel tank when the pressure in the fuel tank is being maintained at substantially the atmospheric pressure until a predetermined constant time elapses after the restart of engine operation and judges that the fuel vapor is not leaking from the fuel tank or the conduit connected to the fuel tank when the pressure in the fuel tank is not longer substantially the atmospheric pressure until a predetermined constant time elapses after the restart of engine operation.

7. A device as set forth in claim 1, wherein said device is provided with refueling possibility judgement means for judging the possibility that the engine has been stopped for refueling and said forgotten fuel cap reattachment judgement means judges whether reattachment of the fuel cap has been forgotten when it is judged that there is a possibility that the engine has been stopped for refueling by the refueling possibility judgement means.

8. A device as set forth in claim 7, wherein
said device is provided with temperature detecting means for detecting a temperature of the engine and
said refueling possibility judgement means judges that there is a possibility that the engine has been stopped for refueling when the temperature difference between the engine temperature at the time the engine is stopped and the engine temperature at the time of restart of engine operation is smaller than a predetermined value.

9. A device as set forth in claim 7, wherein
said device is provided with time detecting means for detecting the time elapsed from when the engine has been stopped to when the operation of the engine is restarted and
said refueling possibility judgement means judges that there is a possibility that the engine has been stopped for refueling when the elapsed time is shorter than a predetermined time.

10. A device as set forth in claim 7, wherein
said device is provided with temperature detecting means for detecting the temperature of the engine and
said forgotten fuel cap reattachment judgement means judges if the reattachment of the fuel cap was forgotten when it is judged by said refueling possibility judgement means that there is a possibility that the engine has been stopped for refueling and the temperature of the engine at the time when the engine is stopped is higher than a predetermined temperature.

11. A device as set forth in claim 1, wherein said device is provided with third Judgement means for judging if the fuel vapor is leaking from the fuel tank or a conduit connected to the fuel tank for reasons other than forgotten reattachment of the fuel cap.

12. A device as set forth in claim 11, wherein said third judgement means judges that the fuel vapor is leaking for reasons other than forgotten reattachment of the fuel cap when it is judged by the first judgement means that the fuel vapor has been leaking and it is judged by the second judgement means that the fuel vapor is leaking.

13. A device as set forth in claim 11, wherein, when the operation of the engine is restarted after the engine has been stopped, it is first judged by said forgotten fuel cap reattachment judgement means if the reattachment of the fuel cap has been forgotten and, when it is judged by said forgotten fuel cap reattachment judgement means that the fuel cap is reattached, it is judged by said third judgement means if there is leakage of the fuel vapor due to reasons other than forgotten reattachment of the fuel cap.

14. A device as set forth in claim 11, wherein said second judgment means judges that the fuel vapor is leaking from the fuel tank or a conduit connected to the fuel tank when the pressure inside the fuel tank is maintained at substantially the atmospheric pressure until a first predetermined set time elapses after the restart of the engine operation;

said third judgment means judges that the fuel vapor is leaking from the fuel tank or a conduit connected to the fuel tank for reasons other than forgotten reattachment of the fuel cap when the pressure inside the fuel tank is maintained at substantially the atmospheric pressure until a third predetermined set time elapses after the restart of the engine operation;

said forgotten fuel cap reattachment judgment means judges that reattachment of the fuel cap of the fuel tank has been forgotten when after a second predetermined set time it is judged by the first judging means that the fuel vapor has not leaked and it is judged by the second judgment means that the fuel vapor is leaking; and the third predetermined set time used during the judgment by the third judgment means is set longer than the second predetermined set time used during the judgment by the forgotten fuel cap reattachment judgment means.

15. A device as set forth in claim 1, wherein said conduit is a conduit connecting the fuel tank and a charcoal canister and a tank internal pressure control valve is arranged inside said conduit.

16. A device as set forth in claim 15, wherein a pressure sensor is arranged in the conduit between the fuel tank and said tank internal pressure control valve and said pressure sensor is used to detect the pressure in the fuel tank.

\* \* \* \* \*